US008415415B2

(12) United States Patent
Karayianni et al.

(10) Patent No.: US 8,415,415 B2
(45) Date of Patent: Apr. 9, 2013

(54) HEAT STABLE HALOGEN-FREE FLAME RETARDANT COPOLYESTER THERMOPLASTIC ELASTOMER COMPOSITIONS

(75) Inventors: Eleni Karayianni, Geneva (CH); David J. Wrigley, Athenaz (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/211,532

(22) Filed: Aug. 17, 2011

(65) Prior Publication Data

US 2012/0211256 A1 Aug. 23, 2012

Related U.S. Application Data

(60) Provisional application No. 61/374,290, filed on Aug. 17, 2010.

(51) Int. Cl.
 *C08K 5/5313* (2006.01)
(52) U.S. Cl. .................. 524/126; 524/133; 174/110 SR
(58) Field of Classification Search .................. 524/126, 524/133; 174/110 SR
 See application file for complete search history.

(56) References Cited

U.S. PATENT DOCUMENTS

| 3,900,444 A | 8/1975 | Racky et al. |
| 4,036,811 A | 7/1977 | Noetzel et al. |
| 4,180,495 A | 12/1979 | Sandler |
| 5,780,534 A | 7/1998 | Kleiner et al. |
| 6,013,707 A | 1/2000 | Kleiner et al. |
| 6,255,371 B1 | 7/2001 | Schlosser et al. |
| 6,270,560 B1 | 8/2001 | Kleiner |
| 2005/0143503 A1 | 6/2005 | Bauer et al. |
| 2009/0275682 A1* | 11/2009 | Furukawa et al. ............ 524/126 |
| 2010/0227957 A1* | 9/2010 | Fujii ............................. 524/126 |

FOREIGN PATENT DOCUMENTS

| EP | 0846712 B1 | 5/2000 |
| EP | 1883081 A1 | 1/2008 |
| WO | 9220731 A1 | 11/1992 |
| WO | 2004029155 A2 | 4/2004 |
| WO | 2008060549 A1 | 5/2008 |
| WO | 2010014796 A2 | 2/2010 |
| WO | 2010039616 A2 | 4/2010 |

OTHER PUBLICATIONS

Kohout, Strength Changes of Moulded Polymide Composite Caused by Thermal Oxidation, Journal of Materials Science, 1999, 34, 843-849, Kluwer Academic Publishers.

* cited by examiner

*Primary Examiner* — Peter Szekely

(57) ABSTRACT

Halogen-free flame retardant compositions exhibiting flame retardance and retention of mechanical properties, especially elongation at break, upon long-term high temperature exposure and comprising a) at least one copolyester thermoplastic elastomer, and b) from at or about 1 to at or about 30 weight percent, based on the total weight of the composition, of at least one flame retardant comprising a phosphinate, diphosphinate and/or polymers of these; c) from at or about 0.25 to at or about 15 weight percent, based on the total weight of the flame retardant composition, of one or more polyhydroxy polymers having a number average molecular weight of at least 2000 and selected from the group consisting of ethylene vinyl alcohol copolymers and poly(vinyl alcohol)s.

15 Claims, No Drawings

HEAT STABLE HALOGEN-FREE FLAME RETARDANT COPOLYESTER THERMOPLASTIC ELASTOMER COMPOSITIONS

CROSS-REFERENCE TO RELATED APPLICATION

This application claims priority from U.S. Patent Application Ser. No. 61/374,290, filed on Aug. 17, 2010, which is incorporated herein by reference in its entirety.

FIELD OF THE INVENTION

The present invention relates to the field of halogen-free flame retardant compositions comprising copolyester thermoplastic elastomers which exhibit good retention of properties, in particular mechanical properties, in the solid state upon high temperature exposure.

BACKGROUND OF THE INVENTION

As a result of their relatively light weight, excellent tear strength, tensile strength, flex life, abrasion resistance, and broad useful end-use temperature range, copolyester thermoplastic elastomers are used in a wide range of applications, including the replacement of metal components in many applications including motor and recreational vehicles, appliances, tools, electronics, furniture, and toys. It is desirable to have high temperature resistant structures made of thermoplastic elastomer materials for use in applications such as components for motorized vehicles and electrical/electronic devices. High temperatures may be routinely reached in the under-hood areas of vehicles, appliance wiring materials, offshore oil and gas applications, and inside laptop computers and cell phones. When these structures are exposed to high temperatures for prolonged periods, the mechanical properties of the article generally tend to be impacted due to the thermo-oxidation of the polymer component. This phenomenon is known as heat aging. International Patent Application Publication No. WO 2010/014796 discloses a method to improve heat aging characteristics of copolyetherester compositions through the use of additives comprising one or more polyhydric alcohols having more than two hydroxyl groups, in particular dipentaerythritol. The disclosed compositions are said to exhibit an improvement in the retention of mechanical properties when exposed to high temperatures.

It is also desirable to have flame retardant structures made of thermoplastic elastomer materials available for use in applications in the fields of construction, furniture, transport and electrical/electronic industries, so as to promote product safety, prevent the spread of fire and reduce destruction of products exposed to fire. The conventional practice for imparting flame retardancy to thermoplastic resin compositions has been the addition of one or more flame retardants or a flame retardant mixture. Such compositions typically include a halogenated organic compound such as brominated polystyrene as the flame retardant and an antimony compound as a synergist.

However, halogenated flame retardants tend to decompose or degrade at processing temperatures of thermoplastic elastomer materials, which implicates potential health and environmental effects due to release of gases. Consequently, the trend has been away from using halogenated compounds or mixtures containing them to impart flame retardancy.

Another conventional approach for imparting flame retardancy to thermoplastic resin compositions has been the addition of red phosphorus to the resins. International Patent Application Publication No. WO 92/20731 discloses a composition comprising an elastomer, a flame retardant comprising red phosphorus and ammonium phosphate as a flame retardant synergist. In addition, the use of fine red phosphorus powder homogeneously dispersed in the resin is known and practiced. A disadvantage of the use of this material is the well-known hazard of fire and explosion related to handling fine red phosphorus powders. Also, the combustion of red phosphorus causes emission of toxic fumes as a result of the formation of phosphine.

To avert the disadvantages and hazards of using halogenated flame retardants and red phosphorus, phosphinate salts, that is, salts of phosphinic acids, also known as phosphinates, have been substituted in thermoplastic resin compositions. German Patent Nos. 2,252,258 and 2,447,727 disclose phosphinates used as flame retardants. U.S. Pat. No. 4,180,495 discloses the use of poly(metal phosphinate salts) in flame retardant polyesters and polyamides. U.S. Pat. No. 6,255,371 discloses flame retardant compositions comprising a) phosphinates, diphosphinates, or polymers of these and b) condensation products of melamine, reaction products of melamine with phosphoric acid, reaction products of condensation products of melamine with phosphoric acid and/or mixtures of these. U.S. Pat. No. 6,270,560 discloses salt mixtures made from aluminum phosphinates, aluminum hydroxide, aluminum phosphonates and/or aluminum phosphates suitable as flame retardants for polymeric molding compositions. U.S. Pat. Nos. 5,780,534 and 6,013,707 disclose flame retardant polyester compositions containing calcium or aluminum salts of phosphinic acid or diphosphinic acid.

A disadvantage of using halogen-free, flame retardant compositions comprising copolyester thermoplastic elastomers based on the existing technology is that, upon exposure to high temperatures, the compositions may not exhibit the retention of mechanical properties necessary for highly demanding applications such as for example in automotive under-the-hood applications and in electrical/electronics applications. Such poor retention of mechanical properties may impair the durability and safety of the article containing the flame retardant copolyester thermoplastic elastomer with use and time.

Therefore, a need remains for halogen-free, flame retardant compositions comprising copolyester thermoplastic elastomers which exhibit the desired flame retardance and necessary mechanical resistance in the solid state, as reflected by retention of mechanical properties on high temperature long-term exposure.

SUMMARY OF THE INVENTION

The present invention is directed to flame retardant compositions comprising:

A. at least one copolyester thermoplastic elastomer;

B. from at or about 1 to at or about 30 weight percent, based on the total weight of the flame retardant composition, of at least one flame retardant selected from the group consisting of phosphinates of formula I, diphosphinates of formula II, polymers thereof, and combinations of two or more thereof

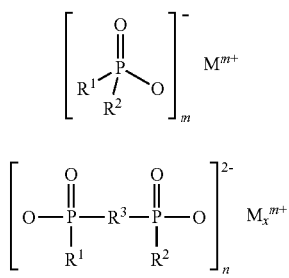

wherein $R^1$ and $R^2$ are independently selected from the group consisting of hydrogen, linear or branched $C_1$-$C_6$ alkyl groups, and aryl groups; $R^3$ is a linear or branched $C_1$-$C_{10}$-alkylene group, a $C_6$-$C_{10}$-arylene group, a $C_6$-$C_{10}$-alkylarylene or a $C_6$-$C_{10}$-arylalkylene group; M is a metal ion selected from the group consisting of calcium ions, magnesium ions, aluminum ions, zinc ions, and mixtures thereof, m is 2 to 3; n is 1 or 3; and x is 1 or 2 with the proviso that when m is 2 in formula II, then x and n are each 1, and when m is 3, x is 2 and n is 3; and C. from at or about 0.25 to at or about 15 weight percent, based on the total weight of the flame retardant composition, of one or more polyhydroxy polymers having a number average molecular weight of at least 2000, selected from the group consisting of ethylene vinyl alcohol copolymers and poly(vinyl alcohol)s.

The invention is also directed to articles comprising the flame retardant composition described above.

In addition, the invention is directed to wires or cables comprising a coating made of the flame retardant compositions described herein.

The invention is further directed to processes for making an article comprising a step of shaping the flame retardant composition described herein, which article demonstrates long-term high temperature aging resistance. In a preferred embodiment, a method for making an article having long-term high temperature aging resistance is described herein, the method comprising the steps of:

A. melt blending a composition of the invention described herein, wherein the melt temperature is at least 260° C.; and B. shaping the melt blended composition to form an article.

In a preferred embodiment, the melt temperature is approximately 270° C.

In addition, the invention is directed to the use of a flame retardant composition for high temperature applications, wherein the flame retardant composition comprises a) the at least one copolyester thermoplastic elastomer described herein, b) the at least one flame retardant comprising a phosphinate selected from the group consisting of phosphinates of formula I, diphosphinates of formula II, polymers thereof, and combinations of two or more thereof described above, and c) the one or more polyhydroxy polymers described herein.

The invention is further directed to the use of one or more polyhydroxy polymers having a number average molecular weight of at least 2000, selected from the group consisting of ethylene vinyl alcohol copolymers and poly(vinyl alcohol)s for imparting retention of mechanical properties, especially elongation at break, upon heat exposure of a flame retardant composition comprising a) the at least one copolyester thermoplastic elastomer described herein, b) from at or about 1 to at or about 30 weight percent, based on the total weight of the flame retardant composition, of the at least one flame retardant comprising a phosphinate selected from the group consisting of phosphinates of formula I, diphosphinates of formula II, polymers thereof, and combinations of two or more thereof described above.

The invention is further directed to articles comprising a melt-mixed blend of the flame retardant composition described above, wherein type 5A test bars having a thickness of 2 mm and an overall length of 75 mm as described in ISO 527-2, made of the flame retardant composition, when exposed in an atmosphere of air and at a temperature of 136° C. for a test period of about 80 hours, and tested according to according to the method of ISO 527 at a testing speed of 50 mm/min, have, on average, a retention of elongation at break of at least 70 percent as compared with that of an unexposed control having identical composition and shape.

DETAILED DESCRIPTION OF THE INVENTION

The following definitions are to be used to interpret the meaning of the terms discussed in the description and recited in the claims.

As used herein, the term "a" refers to one as well as to at least one and is not an article that necessarily limits its referent noun to the singular.

As used herein, the term "about" is intended to mean that the amount or value in question may be the value designated or some other value that is approximately the same. The phrase is intended to convey that similar values promote equivalent results or effects according to the invention.

As used herein, the term "high temperature" refers to temperatures at or in excess of 120° C.

As used herein, the term "long-term" refers to aging at or in excess of 80 hours, preferably at or in excess of 120 hours and more preferably at or in excess of 165 hours.

As used herein, the term "high temperature long-term exposure", "aging", "aged", "heat aging" refers to a combination of exposure factors, i.e. time and temperature. Polymers which demonstrate heat aging performance under lab conditions or under conditions of the lifetime of the polymer such as those reached in underhood areas of automobiles (e.g. at a temperature at or in excess of 120° C., preferably at or in excess of 135° C., wherein the aging or exposure is at or in excess of 80 hours, preferably at or in excess of 120 hours and more preferably at or in excess of 165 hours) can be shown to exhibit similar performance at lower temperatures for a much longer period of aging or exposure. The temperature dependence of the rate constants of polymer degradation is known from the literature such as for example in *Journal of Materials Science*, 34, 843-849 (1999) and is described by the Arrhenius law.

As used herein, the term "melt-mixed blend" is a known term of art and refers to a result whereby all polymeric components of the compositions described herein are well-dispersed within each other and all of the non-polymeric ingredients are homogeneously dispersed in the polymer matrix.

As used herein, the term "high heat stability", as applied to a flame retardant composition described herein or to an article made from the flame retardant composition, refers to the retention of elongation at break of type 5A test bars having a thickness of 2 mm and an overall length of 75 mm as described in ISO 527-2 and comprising the flame retardant composition that has been exposed to air oven aging conditions in an oven at a test temperature of 136° C. for a test period of 80 hours, in an atmosphere of air, and then tested according to the method ISO 527.

As used herein, the term "elongation at break" corresponds to either the tensile strain at break at which a test bar breaks without yielding or the nominal tensile strain at break at which a test bar breaks after yielding as defined in ISO 527-1.

As used herein, the term "retention of elongation at break" corresponds to the percentage of the elongation at break retained after heat aging, relative to the elongation at break value of unexposed samples, which is considered to be 100%.

The flame retardant compositions of the present invention comprise a first component that is at least one copolyester thermoplastic elastomer.

The at least one copolyester thermoplastic elastomer a) in the flame retardant compositions described herein is preferably present in an amount from at or about 60 to at or about 95 weight percent, more preferably from at or about 65 to at or about 90 weight percent, the weight percentage being based on the total weight of the flame retardant composition, i.e. the sum of copolyester thermoplastic elastomer a) plus the at least one flame retardant composition plus the at least one or more polyhydroxy polymers having a number average molecular weight of at least 2000.

The copolyester thermoplastic elastomers (TPCs) useful in the compositions and processes of the present invention include copolyesterester elastomers, copolycarbonateester elastomers, copolyesterester urethane elastomers, and copolyetherester elastomers, the latter being preferred.

Copolyesterester elastomers are block copolymers containing a) hard polyester segments and b) soft and flexible polyester segments. Examples of hard polyester segments are polyalkylene terephthalates, poly(cyclohexanedicarboxylic acid cyclohexanemethanol). Examples of soft polyester segments are aliphatic polyesters, including polybutylene adipate, polytetramethyladipate and polycaprolactone. The copolyesterester elastomers contain blocks of ester units of a high melting polyester and of blocks of ester units of a low melting polyester which are linked together through ester groups and/or urethane groups. Copolyesterester elastomers comprising urethane groups may be prepared by reacting the different polyesters in the molten phase, after which the resulting copolyesterester is reacted with a low molecular weight polyisocyanate, such as for example diphenylmethylene diisocyanate.

Copolycarbonateester elastomers are block copolymers containing a) hard segments consisting of blocks of an aromatic or semi-aromatic polyester and b) soft segments consisting of blocks of a polycarbonate containing polymeric component. Suitably, the copolycarbonateester elastomer is made of hard polyester segments made up of repeating units derived from an aromatic dicarboxylic acid and an aliphatic diol, and of soft segments made up of repeating units of an aliphatic carbonate, and/or soft segments made up of randomly distributed repeating units of an aliphatic carbonate and either an aliphatic diol and an aliphatic dicarboxylic acid or a lactone, or a combination of these, wherein the hard segments and the soft segments can be connected with a urethane group. These elastomers and their preparation are described in, e.g., European Patent No. 0846712.

Copolyetherester elastomers are the preferred thermoplastic elastomers in these flame retardant compositions and have a multiplicity of recurring long-chain ester units and short-chain ester units joined head-to-tail through ester linkages, said long-chain ester units being represented by formula (A):

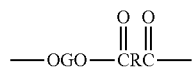

(A)

and said short-chain ester units being represented by formula (B):

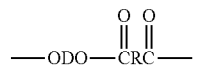

(B)

wherein
G is a divalent radical remaining after the removal of terminal hydroxyl groups from poly(alkylene oxide)glycols having a number average molecular weight of between about 400 and about 6000, or preferably between about 400 and about 3000;
R is a divalent radical remaining after removal of carboxyl groups from a dicarboxylic acid having a molecular weight of less than about 300;
D is a divalent radical remaining after removal of hydroxyl groups from a diol having a molecular weight less than about 250.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

As used herein, the term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, and the like. Especially preferred diols are aliphatic diols containing 2-8 carbon atoms, and a more preferred diol is 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol). As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative. Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation and use of the polymer in the flame retardant compositions of this invention.

The term "aliphatic dicarboxylic acids," as used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in a carbocyclic aromatic ring structure. It is not necessary that both functional carboxyl groups be attached to the same aromatic ring and where more than one ring is present, the rings can be joined by aliphatic or aromatic divalent radicals or divalent radicals such as —O— or —SO$_2$—.

Representative useful aliphatic and cycloaliphatic acids that can be used include sebacic acid; 1,3-cyclohexane dicarboxylic acid; 1,4-cyclohexane dicarboxylic acid; adipic acid; glutaric acid; 4-cyclohexane-1,2-dicarboxylic acid; 2-ethylsuberic acid; cyclopentanedicarboxylic acid; decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl) carboxylic acid; and 3,4-furan dicarboxylic acid. Preferred acids are cyclohexane dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and C$_1$-C$_{12}$ alkyl and ring substitution derivatives of these, such as halo, alkoxy, and aryl derivatives. Hydroxyl acids such as p-(beta-hydroxyethoxy)benzoic acid can also be used provided an aromatic dicarboxylic acid is also used.

Aromatic dicarboxylic acids are a preferred class for preparing the copolyetherester elastomer useful for this invention. Among the aromatic acids, those with 8-16 carbon atoms are preferred, particularly terephthalic acid alone or with a mixture of phthalic and/or isophthalic acids. The copolyetherester elastomers preferably comprise from at or about 15 to at or about 99 weight percent short-chain ester units corresponding to Formula (B) above, the remainder being long-chain ester units corresponding to Formula (A) above. The copolyetheresters more preferably comprise from at or about 20 to at or about 95 weight percent, and even more preferably from at or about 50 to at or about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to prepare the copolyetherester, isophthalic acid is preferred and if a second low molecular weight diol is used, ethylene glycol, 1,3-propanediol, cyclohexanedimethanol, or hexamethylene glycol are preferred.

A blend or mixture of two or more copolyetherester elastomers can be used as the thermoplastic polyester component in the compositions of the invention. The copolyetherester elastomers used in the blend need not on an individual basis come within the values disclosed hereinbefore for the elastomers on an individual basis. However, the blend of two or more copolyetherester elastomers must conform to the values described herein for the copolyetheresters on a weighted average basis. For example, in a mixture that contains equal amounts of two copolyetherester elastomers, one copolyetherester elastomer can contain 60 weight percent short-chain ester units and the other copolyetherester elastomer can contain 30 weight percent short-chain ester units for a weighted average of 45 weight percent short-chain ester units.

Preferably, the copolyetherester elastomers include, but are not limited to, copolyetherester elastomers prepared from monomers comprising (1) poly(tetramethylene oxide) glycol; (2) a dicarboxylic acid selected from the group consisting of isophthalic acid, terephthalic acid, and mixtures thereof; and (3) a diol selected from the group consisting of 1,4-butanediol, 1,3-propanediol, and mixtures thereof, or from monomers comprising (1), poly(trimethylene oxide) glycol; (2) a dicarboxylic acid selected from the group consisting of isophthalic acid, terephthalic acid, and mixtures thereof; and (3) a diol selected from the group consisting of 1,4-butanediol, 1,3-propanediol and mixtures thereof, or from monomers comprising (1) ethylene oxide-capped poly(propylene oxide) glycol; (2) a dicarboxylic acid selected from the group consisting of isophthalic acid, terephthalic acid and mixtures thereof; and (3) a diol selected from the group consisting of 1,4-butanediol, 1,3-propanediol, and mixtures thereof.

Preferably, the copolyetherester elastomers described herein are prepared from esters or mixtures of esters of terephthalic acid and/or isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetheresters are prepared from esters of terephthalic acid, e.g. dimethylterephthalate, 1,4-butanediol and poly(tetramethylene ether)glycol.

As a result of their excellent tear strengths, tensile strengths, flex lives, abrasion resistance, and broad useful end-use temperature ranges, thermoplastic polyetherester elastomers are used in a wide range of applications including for example wire and cable coating, automotive applications, components of household appliances, components for buildings or mechanical devices, and tubes and pipes for conveying fluids. Examples of suitable copolyetherester elastomers are commercially available under the trademark Hytrel® from E. I. du Pont de Nemours and Company, Wilmington, Del.

The copolyester elastomer used in the flame retardant according to the present invention may be a thermoplastic vulcanizate (TPV). Such thermoplastic vulcanizates comprise (i) from about 15 to about 75 weight percent, or preferably from about 15 to about 60 weight percent, of the at least one copolyester elastomer such as those described above that forms a continuous phase; and (ii) from about 25 to about 85 weight percent, or preferably from about 40 to about 85 weight percent of at least one poly(meth)acrylate or polyethylene/(meth)acrylate rubber that forms a dispersed phase, wherein the rubber is dynamically crosslinked with at least one peroxide free radical initiator and at least one organic co-agent having multiple olefinic unsaturated groups, the weight percentage of components (i) and (ii) being based on the total weight of (i) and (ii). Such thermoplastic vulcanizates are described in International. Patent Application Publication Nos. WO 2004/029155 and WO 2008/060549.

The acrylate rubber component of the TPV compositions may be prepared by copolymerizing one or more (meth)acrylate monomers with one or more olefins. A preferred olefin is ethylene. Preferred acrylate rubbers include poly(alkyl (meth)acrylate) rubbers, ethylene/alkyl (meth)acrylate copolymer rubbers and poly(perfluoroalkyl (meth)acrylate) rubbers, and more preferably ethylene/alkyl (meth)acrylate copolymer rubbers where the alkyl group has from 1 to 4 carbons. Preferred ethylene/alkyl (meth)acrylate copolymers are those derived from less than about 80 weight percent of ethylene and more than about 20 weight percent alkyl (meth)acrylate. The acrylate rubbers may optionally comprise additional repeat units derived from one or more functionalized comonomers, such as (meth)acrylate glycidyl esters (such as glycidyl methacrylate), maleic acid, maleic acid esters (such as monoethyl maleate) or other comonomers having one or more reactive groups including acid, hydroxyl, epoxy, isocyanate, amine, oxazoline, chloroacetate, or diene functionality. The acrylate rubbers may also be prepared from more than two (meth)acrylate monomers. Examples are acrylate rubbers made by polymerizing ethylene, methyl acrylate, and a second acrylate (such as butyl acrylate).

Thermoplastic vulcanizates useful in the present invention may be prepared using processes such as those described in International Patent Application Publication No. WO 2004/029155. The actual mixing of components and subsequent dynamic crosslinking may be performed either in a batch mode or a continuous mode using conventional melt blending equipment.

The thermoplastic vulcanizates described herein may be prepared by mixing at least one of the above-described copolyester elastomers with at least one of the above-described acrylate rubbers in the presence of an organic peroxide free radical initiator and an organic diene (i.e. multiolefinic) co-agent. The resultant composition is then dynamically cured to produce a TPV having a crosslinked dispersed phase within a thermoplastic continuous phase.

Suitable free-radical initiators include but are not limited to 2,5-dimethyl-2,5-di-(t-butylperoxy)hexyne-3; t-butyl peroxybenzoate; 2,5-dimethyl-2,5-di-(t-butylperoxy)hexane; dicumyl peroxide; α,α-bis(t-butylperoxy)-2,5-dimethylhexane; and the like.

Suitable organic multiolefinic co-agents include but are not limited to diethylene glycol diacrylate; diethylene glycol dimethacrylate; N,N'-m-phenylene dimaleimide; triallylisocyanurate; trimethylolpropane trimethacrylate; tetraallyloxyethane; triallyl cyanurate; tetramethylene diacrylate; polyethylene glycol dimethacrylate; and the like.

The second component of the flame retardant composition described herein comprises at least one flame retardant (also referred to in the art as a flameproofing agent). Flame retardants are used in thermoplastic compositions to suppress, reduce, delay or modify the propagation of a flame through the composition or article made of the flame retardant composition. The at least one flame retardant is preferably present in the flame retardant composition of the invention described herein in an amount from at or about 1 to at or about 30 weight percent, more preferably at or about 2 to at or about 25 weight percent, the weight percentage being based on the total weight of the flame retardant composition.

Preferably, the at least one flame retardant is a non-halogenated flame retardant and more preferably, it is selected from phosphinates of formula (C), diphosphinates of formula (D), polymers thereof, and mixtures thereof:

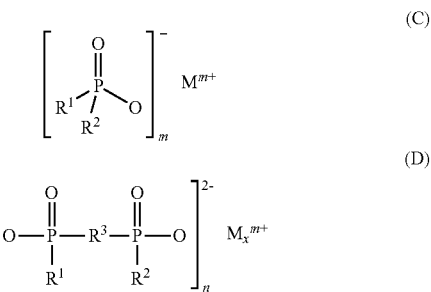

wherein each of $R^1$ and $R^2$ independently is hydrogen, a linear $C_1$-$C_6$ alkyl group, a branched $C_1$-$C_6$ alkyl group or an aryl group; $R^3$ is a linear $C_1$-$C_{10}$-alkylene group, a branched $C_1$-$C_{10}$-alkylene group, a $C_6$-$C_{10}$-arylene group, a $C_6$-$C_{10}$-alkylarylene or a $C_6$-$C_{10}$-arylalkylene group; M is a metal ion selected from the group consisting of calcium ions, magnesium ions, aluminum ions, zinc ions, and mixtures thereof, m is 2 to 3; n is 1 or 3; and x is 1 or 2 with the proviso that when m is 2, then x and n are each 1, and when m is 3, x is 2 and n is 3.

$R^1$ and $R^2$ are preferably hydrogen, methyl, ethyl, n-propyl, isopropyl, n-butyl, tert-butyl, n-pentyl and/or phenyl. $R^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably a metal ion selected from the group consisting of aluminum ions, zinc ions, and mixtures thereof.

Preferred phosphinates are metal salts of organic phosphinates, such as methylethylphosphinates and diethylphosphinates. More preferred are aluminum methylethylphosphinate, aluminum diethylphosphinate, zinc methylethylphosphinate, and zinc diethylphosphinate. Also preferred are aluminum phosphinate, magnesium phosphinate, calcium phosphinate, and zinc phosphinate.

The flame retardant can have any particle size distribution, as commonly understood and used by those having skill in the art, but preferably it has a particle size (D90 value) of less than or equal to 100 microns and more preferably less than or equal to 20 microns. The D90 value corresponds to a particle size below which 90 weight percent of the particles lie, wherein the particle size distribution is measured by the technique of laser diffraction from a suspension of particles in a solvent as determined using a Mastersizer 2000 particle size analyzer available from Malvern Instruments Ltd. This test method meets the requirements set forth in ISO 13320.

The third component of the flame retardant composition described herein comprises from at or about 0.25 to at or about 15 weight percent of one or more polyhydroxy polymers selected from the group consisting of ethylene vinyl alcohol copolymers and poly(vinyl alcohol)s, preferably from at or about 0.5 to at or about 10 weight percent and more preferably from at or about 1 to at or about 5 weight percent, the weight percentage being based on the total weight of the flame retardant composition.

The one or more polyhydroxy polymers have a number average molecular weight (Mn) of at least 2000 and preferably from at or about 5000 to at or about 50000, the number average molecular weight (Mn) being determined by gel permeation chromatography (GPC).

Preferably, the one or more polyhydroxy polymers selected from the group consisting of ethylene vinyl alcohol copolymers and poly(vinyl alcohol)s comprise ethylene vinyl alcohol copolymers. Ethylene vinyl alcohol copolymers are commonly known as EVOH. Poly(vinyl alcohol)s are commonly known as PVOH.

The ethylene vinyl alcohol copolymers preferably comprise repeat units of vinyl alcohol in amounts of from at or about 10 to at or about 90 mol %, more preferably from at or about 30 to at or about 80 mol % and still more preferably from at or about 40 to at or about 70 mol %. The remainder of the ethylene vinyl alcohol copolymer is comprised of copolymerized units of ethylene.

The ethylene vinyl alcohol copolymers preferably have a density (measured according to ISO 1183) from at or about 1.12 g/cm$^3$ to at or about 1.20 gm/cm$^3$ and a melting temperature (measured according to ISO 11357) from at or about 140° C. and 190° C. Ethylene vinyl alcohol copolymers can be prepared by known preparative techniques or can be obtained from commercial sources. They are prepared by saponifying or hydrolyzing ethylene vinyl acetate copolymers. The degree of hydrolysis is preferably from greater than 50% and more preferably from at or about 85 to 100 mole percent.

Suitable EVOH copolymers for use in the present invention may be obtained from Nippon Gosei (Tokyo, Japan) under the tradename Soarnol® A or D and from Kuraray (Tokyo, Japan) under the tradename EVAL®.

Poly(vinyl alcohol)(s) suitable for use in the composition of the invention and having varying degrees of hydrolysis, i.e., from about 50% to 99.5+%, are widely available commercially. Preferred polyvinyl alcohols have a degree of hydrolysis of about 80-99%. Higher molecular weight poly(vinyl alcohol)s, e.g. having number average molecular weights above 145,000, have better moisture resistance and are preferred. Suitable poly(vinyl) alcohol polymers include the Mowiol® brand resins available from Kuraray Europe Gmbh and Celvol® Polyvinyl Alcohol resins from Sekisui Chemical Co., Ltd.

The compositions of the present invention may further comprise one or more flame retardant synergists. The one or more flame retardant synergists are preferably selected from phosphorus containing compounds, nitrogen containing compounds, nitrogen/phosphorus containing compounds, inorganic compounds and mixtures of these.

Phosphorus containing compounds are preferably selected from phosphates, phosphonates, phosphonites, phosphites, phosphinites, phosphinates other than the flame retardant that is the second component of the compositions of the invention, polymers of these, and mixtures of these. Suitable phosphorus containing compounds include but are not limited to alkyl diphenyl phosphates; trimethyl phosphate ($C_3H_9O_4P$); triphenyl phosphate ($C_{18}H_{15}O_4P$); trialkyl phosphates, such as triethyl phosphate ($C_6H_{15}O_4P$) and trioctyl phosphate ($C_{24}H_{51}O_4P$); all isomers of tricresyl phosphates; all isomers of trixylyl phosphates; all isomers of tricumyl phosphates; m-phenylene-bis(diphenylphosphate), p-phenylene-bis(diphenylphosphate); m-phenylene-bis(dicresylphosphate), p-phenylene-bis(dicresylphosphate); m-phenylene bis(dixylylphosphate), p-phenylene-bis(dixylylphosphate); bisphenol A bis(diphenylphosphate), bis phenol A bis(dicresylphosphate); bisphenol A bis(dixylylphosphate), and mixtures of these.

Suitable nitrogen containing compounds include but are not limited to benzoguanamine, tris(hydroxyethyl)isocyanurate, allantoine, glycoluril, urea, melamine, condensation products of melamine (such as melem, melan and melon), melamine cyanurate, dicyandiamide, guanidine and carbodiimide, and derivatives of these.

Suitable nitrogen/phosphorus containing compounds include but are not limited to ammonium phosphates, such as monoammonium phosphate, diammonium phosphate, ammonium polyphosphate; amine phosphates such as melamine phosphate, dimelamine phosphate, trimelamine diphosphate, tetrakismelamine triphosphate, pentamelamine triphosphate, hexakismelamine pentaphosphate, melamine diphosphate, melamine tetraphosphate, melamine polyphosphate, melem polyphosphate, melon polyphosphate and melam polyphosphate, melamine pyrophosphate and dimelamine pyrophosphate.

Suitable inorganic compounds include but are not limited to the elements of the first subgroup of the periodic table, elements of the second main group and subgroup of the periodic table, elements of the third main group and subgroup of the periodic table, elements of the fourth main group and subgroup of the periodic table, elements of the eighth subgroup of the periodic table, and compounds of the lanthanide series. Compounds of the elements carbon, including graphite, aluminum, boron, calcium, magnesium, zinc and tin are particularly preferred.

Suitable aluminum compounds include without limitation aluminum oxide, aluminum oxide hydroxide, boehmite, aluminum hydroxide, aluminosilicates and aluminum phosphate. Suitable calcium compounds include without limitation calcium oxide, calcium borate, calcium pyroborate, calcium carbonate, calcium hydroxide, calcium phosphate, calcium hydrogen phosphate, calcium pyrophosphate and hydrocalumite. Suitable magnesium compounds include without limitation magnesium oxide, magnesium hydroxide, magnesium oxide hydroxides, hydrotalcites, dihydrotalcite, magnesium carbonates, basic magnesium carbonates, magnesium calcium carbonates, monobasic, dibasic, and tribasic magnesium phosphate, magnesium hydrogen phosphate, magnesium pyrophosphate, and magnesium borate. Suitable zinc compounds include without limitation zinc oxide, zinc hydroxide, zinc borate, zinc carbonate, zinc hydroxide carbonate, zinc silicate, zinc hexafluorosilicate, zinc stannate, zinc magnesium aluminum carbonate, zinc phosphate, zinc hydrogen phosphate, zinc pyrophosphate, zinc chromate, zinc chromite, zinc molybdate, zinc permanganate, zinc molybdate-magnesium silicate, zinc formates, zinc acetates, zinc trifluoroacetate, zinc propionate, zinc butyrate, zinc valerate, zinc caprylate, zinc oleate, zinc stearate, zinc oxalate, zinc tartrate, zinc citrate, zinc benzoate, zinc salicylate, zinc lactate, zinc phenolate, zinc acetylacetonate, zinc tannate, zinc dimethyldithiocarbamate, zinc trifluoromethanesulfonate, zinc phosphide, zinc sulfide, zinc selenide, and zinc telluride. Suitable tin compounds include without limitation tin oxide, hydrated tin oxides, tin(II) hydroxide and tin sulfide.

When one or more flame retardant synergists are used in combination with the at least one flame retardant that is the second component of the compositions of the invention, it is preferred that the combination of the flame retardant, i.e. a flame retardant selected from the group consisting of phosphinates of formula I, diphosphinates of formula II, polymers thereof, and combinations of two or more thereof and the one or more flame retardant synergists, is present in an amount from at or about 1 to at or about 40 weight percent, the weight percentage being based on the total weight of the flame retardant composition.

The compositions of the present invention may further comprise one or more amorphous polymers. When used, the one or more amorphous polymers are preferably present in an amount from at or about 1 to at or about 30 weight percent, more preferably from at or about 10 to at or about 30 weight percent and still more preferably from at or about 15 to at or about 25 weight percent, the weight percentage being based on the total weight of the flame retardant composition. The one or more amorphous polymers are preferably selected from polycarbonates, polyarylates, amorphous polyester copolymers, poly(methyl methacrylate) ("PMMA"), and mixtures thereof. Amorphous polymers do not crystallize, even upon annealing. Amorphous polymers are characterized by their glass transition temperature, Tg, which is the temperature at which the polymers are transformed from a glassy state to a rubbery state. More preferably, the one or more amorphous polymers are selected from polycarbonates, polyarylates, and mixtures thereof. Polycarbonates are polymers which comprise carbonate linkages. Preferably, polycarbonates used in the present invention are aromatic polycarbonates, i.e. polymers which contain carbonate groups and aromatic moieties in the main polymer chain. Aromatic polycarbonates include homopolycarbonates, copolycarbonates, copolyestercarbonates, and mixtures thereof. Preferably, the polycarbonates used in the present invention are high molecular weight polymers having a weight average molecular weight (Mw) from at or about 8000 to at or about 200000, the weight average molecular weight (Mw) being determined by gel permeation chromatography (GPC). Polycarbonates are produced by using a dihydroxydiarylalkane as the main starting material, including those wherein the alkane is branched. Such polycarbonates are manufactured by known processes, generally by reaction of a dihydroxy compound and/or a polyhydroxy compound with either phosgene or a diester of carbonic acid. More preferably, the polycarbonates used in the present invention are based on 4,4'-dihydroxy-2,2-diphenylpropane (i.e. bisphenol A, "BPA") and are commonly referred to as bisphenol A polycarbonates. Polyarylates are polymers derived from the reaction of a polyhydroxy compound with a polycarboxylic acid compound, preferably from the reaction of one or more dihydroxy compounds with one or more polycarboxylic acid compounds, and more preferably from the reaction of one or more dihydroxy compounds with one or more dicarboxylic acid compounds. Examples of polyhydroxy compounds include without limitation bisphenols, dihydric phenol ethers, dihydroxyaryl sulfones, dihydroxy benzenes, halo- and alkyl-substituted dihydroxy benzenes. Examples of polycarboxylic acid compounds include without limitation monocyclic aromatic dicarboxylic acids such as for example benzenedicarboxylic acids including phthalic acid, isophthalic acid, terephthalic acid, o-, m-, and p-phenylenediacetic acids; bis(carboxyaryl) $C_{1-6}$alkanes; and polycyclic aromatic dicarboxylic acids such as for example diphenic acid and 1,4-naphthalic acid. More preferably, the polyarylates used in the present invention are derived from the reaction of 4,4'-dihydroxy-2,2-diphenylpropane (bisphenol A) and a mixture of isophthalic acid and terephthalic acid and still more preferably from the reaction of 4,4'-dihydroxy-2,2-diphenylpropane (bisphenol A) and a 50:50 mixture of isophthalic acid:terephthalic acid.

The flame retardant composition described herein may further comprise one or more heat stabilizers and/or antioxidants and/or metal deactivators (e.g. hydrazines, hydrazides and mixtures thereof). Preferably, the one or more heat stabilizers and/or antioxidants are selected from diphenylamines, amides, thioesters, phenolic antioxidants, phosphites and mixtures thereof. When used, the heat stabilizers and/or antioxidants are preferably present in an amount of from at or about 0.01 to at or about 6 weight percent, or more preferably from at or about 0.01 to at or about 3 weight percent, the weight percentage being based on the total weight of the flame retardant composition.

The flame retardant composition described herein may further comprise additional additives such as synergists, colorants, fillers and reinforcing agents, impact modifiers, conductive additives, viscosity modifiers, nucleating agents, plasticizers, drip suppressants, and adhesion modifiers.

Fillers, modifiers and other ingredients described above may be present in the flame retardant composition in amounts and in forms well known in the art, including in the form of so-called nano-materials where at least one of the dimensions of the particles is in the range of 1 to 1000 nm.

The flame retardant compositions are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; a Haake mixer, a Brabender mixer, a Banbury mixer, or a roll mixer, either simultaneously by a single step addition, or in a stepwise fashion, and then melt-mixed. When adding the polymeric components and non-polymeric ingredients in a stepwise fashion, a portion of the polymeric components and/or non-polymeric ingredients are first added and melt-mixed. The remaining polymeric components and non-polymeric ingredients are subsequently added and the composition is further melt-mixed until a well-blended composition is obtained.

Also described herein are uses of a flame retardant composition for high temperature applications, wherein the flame retardant composition comprises a) the at least one copolyester thermoplastic elastomer described herein, b) the at least one flame retardant comprising a phosphinate of the formula (I); and/or diphosphinate of the formula (II); and/or polymers of (I) and/or (II) described herein, and c) the one or more polyhydroxy polymers having a number average molecular weight of at least 2000, selected from the group consisting of ethylene vinyl alcohol copolymers and poly(vinyl alcohol)s, especially ethylene vinyl alcohol copolymers, described herein.

Also described herein are uses of the one or more polyhydroxy polymers having a number average molecular weight of at least 2000, selected from the group consisting of ethylene vinyl alcohol copolymers and poly(vinyl alcohol)s, especially ethylene vinyl alcohol copolymers, described herein for imparting retention of mechanical properties, especially elongation at break, upon heat exposure to a composition comprising a) at least one copolyester thermoplastic elastomer and b) the at least one flame retardant comprising a phosphinate of the formula (I); and/or diphosphinate of the formula (II); and/or polymers of (I) and/or (II) described herein.

Also described herein are methods for imparting retention of mechanical properties, especially elongation at break, to articles made of a flame retardant composition, the method comprising i) melt blending a) the at least one copolyester thermoplastic elastomer described herein, b) from at or about 1 to at or about 30 weight percent, based on the total weight of the flame retardant composition, of the at least one flame retardant comprising a phosphinate of the formula (I); and/or diphosphinate of the formula (II); and/or polymers of (I) and/or (II) described herein and c) from at or about 0.25 to at or about 15 weight percent, based on the total weight of the flame retardant composition, of the one or more polyhydroxy polymers, especially ethylene vinyl alcohol copolymers, described herein, so as to form a flame retardant composition, and ii) shaping said flame retardant composition. Preferably the melt temperature is at least 260° C. and more preferably, the melt temperature is approximately 270° C.

Also described herein are methods for making an article having long-term high temperature aging resistance, the method comprising i) melt blending a) the at least one copolyester thermoplastic elastomer described herein, b) from at or about 1 to at or about 30 weight percent, based on the total weight of the flame retardant composition, of the at least one flame retardant comprising a phosphinate of the formula (I); and/or diphosphinate of the formula (II); and/or polymers of (I) and/or (II) described herein and c) from at or about 0.25 to at or about 15 weight percent, based on the total weight of the flame retardant composition, of the one or more polyhydroxy polymers, especially ethylene vinyl alcohol copolymers, described herein, so as to form a flame retardant composition, and ii) shaping said melt blended flame retardant composition. Preferably the melt temperature is at least 260° C. and more preferably, the melt temperature is approximately 270° C.

The flame retardant compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments, wire and cable coating; photovoltaic cable coating, optical fiber coating, tubing and pipes; fabrics, nonwovens or textiles made of fibers and filaments, e.g. those used in clothing or carpets; films and membranes such breathable membranes used in roofing and building/construction; motorized vehicle parts such as body panels, air bag doors, dashboards, engine covers, rocker panels or air filter covers; components for household appliances, such as washers, dryers, refrigerators and heating-ventilation-air conditioning appliances; connectors used in electrical/electronic applications; components for electronic devices, such as computers; components for office-, indoor-, and outdoor-furniture; and footwear components.

Also described herein are methods for manufacturing an article by shaping the flame retardant composition described herein and the article prepared therefrom, which article demonstrates long-term high temperature aging resistance. By "shaping", it is meant any shaping technique known to those skilled in the art, such as for example injection molding, blow molding, injection blow molding, extrusion, thermoforming, compression molding, rotational molding, vacuum molding, slush molding, melt casting, filament extrusion and fiber spinning.

Also described herein are articles having high heat stability over a period of about 80 hours at 136° C. These articles comprise a melt-mixed blend of the flame retardant composition described herein, wherein type 5A test bars having a thickness of 2 mm and an overall length of 75 mm as described in ISO 527-2, made of the flame retardant composition, when exposed in an atmosphere of air and at a temperature of 136° C. for a test period of about 80 hours, and tested according to the method of ISO 527 at a testing speed of 50 mm/min, have, on average, a retention of elongation at break of at least 70 percent as compared with that of an unexposed control having identical composition and shape.

The retention of elongation at break is an appropriate measure of the thermal stability of molded articles of polymer elastomer compositions.

Due to the combination of flame retardancy and retention of mechanical properties upon high temperature exposure, the flame retardant compositions according to the present invention are particularly suited for producing an insulating layer. The flame retardant composition described herein is particularly suited for producing a wire or cable coated with the flame retardant composition and even more particularly suited for producing a wire or cable useful in automotive applications, in building applications and computer charger cords. Indeed, the flame retardant compositions described herein have the particular advantage of combining flame retardancy, good chemical and temperature resistance and good retention of physical properties, particularly elongation, after long-term heat aging in air at temperatures as high as 150° C. This unique combination of properties makes the compositions of the invention very attractive candidates for use in wire and cable applications and especially in wire and cable constructions for use in automotive applications, in building applications and computer charger cords. Wire and cable used in automotive applications is subjected to high temperature. Wires and cables may be coated with the flame retardant compositions described herein by processes known in the art such as for example by an extrusion process wherein the flame retardant compositions are extruded over the wires and cables at high speed using a single screw extruder with a tubular die.

The invention is further described in the Examples below, which are provided to describe the invention in further detail. These examples, which set forth a preferred mode presently contemplated for carrying out the invention, are intended to illustrate and not to limit the invention.

EXAMPLES

The following materials were used for preparing an insulating composition according to the present invention and a comparative example.

Materials

Copolyester thermoplastic elastomer (TPC): a copolyetherester elastomer comprising about 26.4 weight percent of poly(tetramethylene oxide) copolymerized units having an average molecular weight of about 1000 g/mol as polyether block segments, the weight percentage being based on the total weight of the copolyetherester elastomer, the short chain ester units of the copolyetherester being polybutylene terephthalate segments.

As required for the manufacturing process and well-known to those skilled in the art, the copolyetherester elastomer contained up to 6 weight percent of heat stabilizers, antioxidants and metal deactivators.

Flame retardant: Exolit® OP935 flame retardant, an aluminum salt of diethylene phosphinate having a D90 max of 7.506 microns supplied by Clariant Corporation.

Polyhydroxy Polymer 1: EVAL® F101B resin, an ethylene vinyl alcohol copolymer having about 68 mol % of vinyl alcohol repeat units and 32 mol % of copolymerized ethylene units commercially available from Kuraray Co., Ltd.

Polyhydroxy Polymer 2: EVAL® E105B resin, an ethylene vinyl alcohol copolymer having about 56 mol % of vinyl alcohol repeat units and 44 mol % of copolymerized ethylene units commercially available from Kuraray Co., Ltd.

Dipentaerythritol (DPE): dipentaerythritol commercially available from Perstorp Speciality Chemicals AB, Perstorp, Sweden as Di-Penta 93.

Test Methods

Flame retardant compositions of the invention Examples 1 and 2 (Samples E1-E2) and comparative compositions (Samples C-A and C-B) were prepared as follows. The above-described copolyetherester elastomer (TPC), flame retardant and ethylene vinyl alcohol copolymer (EVOH), in the amounts listed in Table 1 were melt blended in a 40 mm twin screw extruder (Berstorff ZE40) operated at a barrel temperature of about 230° C. using a screw speed of about 180 rpm and a throughput of 40-50 kg/hour. The melt temperature was approximately 270° C. The Comparative Example C-A composition was prepared in a similar manner, except that it did not contain ethylene vinyl alcohol copolymer. The Comparative Example C-B composition was prepared in a similar manner, except that it also did not contain ethylene vinyl alcohol copolymer and it contained dipentaerythritol in the amount listed in Table 1.

The compounded melt blended mixtures were extruded in the form of laces or strands, cooled in a water bath, chopped into granules and placed in sealed aluminum lined bags in order to prevent moisture pick-up.

Quantities shown in Table 1 are presented in weight percent on the basis of the total weight of the composition.

Flammability testing was performed according to UL 94 test standard, 20 mm vertical burning test. Test specimens were formed from compositions of the invention (Samples E1 and E2) and from comparative compositions (Samples C-A and C-B) by injection molding the compositions in the form of test bars having dimensions of 125 mm by 13 mm and a thickness of 0.8 mm. Before measurement, the test specimens were conditioned for 48 hours at 23° C. and 50% relative humidity. According to this procedure test specimens were clamped with the longitudinal axis of the specimen in the vertical direction, so that the lower end of the specimen was 300 mm above a horizontal layer of dry absorbent surgical cotton. A burner producing a blue flame 20 mm high was placed such that the flame was applied centrally to the middle point of the bottom edge of the specimen for 10 seconds. After the application of the flame to the specimen for 10 seconds, the burner was withdrawn from the sample and the after-flame time, $t_1$, was measured. When after-flaming of the test specimen ceased, the burner was again placed under the specimen for an additional 10 seconds. The flame was then withdrawn from the test specimen and the second after-flame time, $t_2$, was measured. Materials are classified according to the test specifications as V-0, V-1 or V-2, based on the behavior of the material during burning, V-2 being the least demanding classification.

Physical property measurement was conducted as follows. Prior to injection molding, the granules of the flame retardant compositions prepared according to the above-described method were dried to provide granulated compositions having a moisture level below 0.05 percent. Elongation at break was measured according to the method ISO 527 using injection molded ISO tensile bar 5A samples (melt temperature=240° C.; mold temperature=45° C. and a hold pressure of 70 MPa). The thickness of the test specimen was 2 mm. The length of the specimen was 75 mm and the test speed was 50 mm/min.

The test specimens were heat aged in re-circulating air ovens (Heraeus type UT6060) according to the procedure described in ISO 2578. At various heat aging times, the test specimens were removed from the oven, allowed to cool to room temperature and sealed into aluminum lined bags until ready for testing. The tensile mechanical properties were then measured according to ISO 527 using a Zwick tensile instrument. The average values obtained from 5 specimens are shown in Table 1.

Retention of elongation at break corresponds to the percentage of the elongation at break value retained after heat aging at a temperature of 136° C. for 40, 80, 120 and 168 hours in comparison with the value of elongation at break of specimens that were not subjected to heat aging considered as being 100%. Retention results are shown in Table 1.

TABLE 1

|  | Example | | | |
| --- | --- | --- | --- | --- |
|  | C-A | C-B | E1 | E2 |
| TPC (wt. %) | 80 | 79 | 77 | 77 |
| Flame retardant (wt. %) | 20 | 20 | 20 | 20 |
| Polyhydroxy Polymer 1 (wt. %) | — | — | 3 | — |
| Polyhydroxy Polymer 2 (wt. %) | — | — | — | 3 |
| DPE (wt. %) | — | 1 | — | — |
| Flammability testing (UL-V performance) | V2 | V2 | V2 | V2 |
| Heat aging, 0 hours | | | | |
| Elongation at break (%) | 306 | 319 | 259 | 271 |
| Heat aging, 40 hours, 136° C. | | | | |
| Elongation at break (%) | 261 | 135 | 182 | 234 |
| % Retention of elongation at break | 85% | 42% | 70% | 86% |
| Heat aging, 80 hours, 136° C. | | | | |
| Elongation at break (%) | 181 | 93 | 192 | 240 |
| % Retention of elongation at break | 59% | 29% | 74% | 88% |
| Heat aging, 120 hours, 136° C. | | | | |
| Elongation at break (%) | 142 | 87 | 158 | 217 |
| % Retention of elongation at break | 46% | 27% | 61% | 80% |
| Heat aging, 168 hours, 136° C. | | | | |
| Elongation at break (%) | 121 | 78 | 136 | 222 |
| % Retention of elongation at break | 40% | 24% | 52% | 82% |

Ingredient quantities are presented in weight percent based on the total weight of the flame retardant composition.

The data presented in Table 1 indicate that the comparative composition comprising only the flame retardant (Sample C-A) exhibited low heat resistance in terms of retention of elongation at break in the solid state after exposure to heat aging at 136° C. for 80 hours, 120 hours or 168 hours, as reflected in % retention of elongation at break.

The incorporation of dipentaerythritol (DPE) in a flame retardant TPC composition substantially lowered the heat age resistance of the composition (Sample C-B) in the solid state compared to that of the comparative composition C-A as reflected by % retention of elongation at break. Even after only 40 hours heat aging at 136° C., the difference in % retention of elongation at break between the two samples is substantial.

The incorporation of a polyhydroxy polymer having a number average molecular weight of at least 2000 in flame retardant compositions comprising a copolyester thermoplastic elastomer conferred a particular advantage to the compositions with respect to retention of mechanical properties such as elongation at break after high temperature long-term exposure in the solid state. The data shown in Table 1 indicate that when compositions that comprise a polyhydroxy compound having a weight average molecular weight above 2000 (Polyhydroxy Polymers 1 and 2; Samples E1 and E2) are compared to similar compositions that contain polyhydric alcohols having molecular weights less than 2000, for instance dipentaerythritol, (Sample C-B) heat resistance of the compositions in the solid state (as measured by retention of elongation at break) is significantly better in the compositions that comprise the high molecular weight polymers. In addition, good flame retardance is maintained. Thus, after being heat aged for 80 hours, samples E1-E2 exhibited a substantially higher heat resistance compared to comparative compositions samples C-A and C-B, as reflected by a % retention of the elongation at break value of at least 70% versus retention values of 59% and 29%, respectively for samples C-A and C-B. After being heat aged for 120 hours, samples E1-E2 exhibited a substantially higher heat resistance compared to comparative compositions C-A and C-B, as reflected by a % retention of the elongation at break value of at least 60% versus retention values of 46% and 27%, respectively for C-A and C-B.

Compositions according to the invention (Samples E1-E2) not only had good flame retardant properties, they also exhibited good retention of mechanical properties in the solid state upon exposure to heat, as shown by the % retention of elongation at break after 80 hours, 120 hours or 168 hours at 136° C.

What is claimed is:

1. A flame retardant composition comprising:
A. at least one copolyester thermoplastic elastomer;
B. from at or about 1 to at or about 30 weight percent, based on the total weight of the flame retardant composition, of at least one flame retardant selected from the group consisting of phosphinates of formula I, diphosphinates of formula II, polymers thereof and combinations of two or more thereof

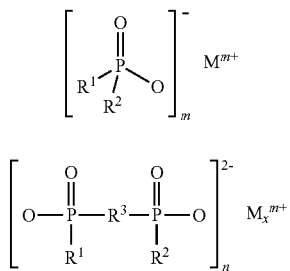

wherein $R^1$ and $R^2$ are independently selected from the group consisting of hydrogen, linear or branched $C_1$-$C_6$ alkyl groups, and aryl groups; $R^3$ is a linear or branched $C_1$-$C_{10}$-alkylene group, a $C_6$-$C_{10}$-arylene group, a $C_6$-$C_{10}$-alkylarylene, or a $C_6$-$C_{10}$-arylalkylene group; M is a metal ion selected from the group consisting of calcium ions, magnesium ions, aluminum ions, zinc ions, and mixtures thereof, m is 2 to 3; n is 1 or 3; and x is 1 or 2 with the proviso that when m is 2 in formula II, then x and n are each 1, and when m is 3, x is 2 and n is 3; and C. from at or about 0.25 to at or about 15 weight percent, based on the total weight of the flame retardant composition, of one or more polyhydroxy polymers having a number average molecular weight of at least 2000, selected from the group consisting of ethylene vinyl alcohol copolymers and poly(vinyl alcohol)s.

2. A flame retardant composition of claim 1, wherein the at least one copolyester thermoplastic elastomer is a copolyetherester elastomer having a multiplicity of recurring long-chain ester units and short-chain ester units joined head-to-tail through ester linkages, said long-chain ester units being represented by formula (A):

and said short-chain ester units being represented by formula (B):

wherein:
G is a divalent radical remaining after the removal of terminal hydroxyl groups from poly(alkylene oxide)glycols having a number average molecular weight of between about 400 and about 6000;
R is a divalent radical remaining after removal of carboxyl groups from a dicarboxylic acid having a molecular weight of less than about 300; and
D is a divalent radical remaining after removal of hydroxyl groups from a diol having a molecular weight less than about 250.

3. A flame retardant composition of claim 1, wherein the at least one copolyester thermoplastic elastomer is prepared from monomers comprising:
(1) poly(tetramethylene oxide) glycol;
(2) a dicarboxylic acid selected from the group consisting of isophthalic acid, terephthalic acid, and mixtures thereof; and
(3) a diol selected from the group consisting of 1,4-butanediol, 1,3-propanediol, and mixtures thereof.

4. A flame retardant composition of claim 1, wherein the at least one copolyester thermoplastic elastomer is prepared from monomers comprising:
(1) poly(trimethylene oxide) glycol;
(2) a dicarboxylic acid selected from the group consisting of isophthalic acid, terephthalic acid, and mixtures thereof; and
(3) a diol selected from 1,4-butanediol, 1,3-propanediol, and mixtures thereof.

5. A flame retardant composition of claim 1, wherein the at least one thermoplastic elastomer is prepared from copolyetherester resins prepared from monomers comprising:
(1) ethylene oxide-capped poly(propylene oxide) glycol;
(2) a dicarboxylic acid selected from the group consisting of isophthalic acid, terephthalic acid, and mixtures thereof; and (3) a diol selected from the group consisting of 1,4-butanediol, 1,3-propanediol, and mixtures thereof.

6. A flame retardant composition of claim 1, wherein the at least one flame retardant b) is selected from the group consisting of aluminum phosphinate, aluminum diethyl phosphinate, zinc diethyl phosphinate and mixtures thereof.

7. A flame retardant composition of claim 1, wherein the at least one flame retardant b) has a particle size (D90 value) less than or equal to 100 microns.

8. A flame retardant composition of claim 1, wherein the one or more polyhydroxy polymers comprise ethylene vinyl alcohol copolymers.

9. A flame retardant composition of claim 8, wherein the ethylene vinyl alcohol copolymers comprise repeat units of vinyl alcohol in amounts of from at or about 10 to at or about 90 mol %, the remainder of the ethylene vinyl alcohol copolymer being comprised of copolymerized units of ethylene.

10. A flame retardant composition of claim 1 further comprising an additive selected from the group consisting of heat stabilizers, antioxidants and metal deactivators.

11. A flame retardant composition of claim 1 further comprising one or more flame retardant synergists.

12. A shaped article comprising the flame retardant composition recited in claim 1.

13. A wire or cable comprising a coating made of the flame retardant composition recited in claim 1.

14. An article comprising a melt-mixed blend of a flame retardant composition comprising:

A. at least one copolyester thermoplastic elastomer;

B. from at or about 1 to at or about 30 weight percent, based on the total weight of the flame retardant composition, of at least one flame retardant selected from the group consisting of phosphinates of formula I, diphosphinates of formula II, polymers thereof and combinations of two or more thereof

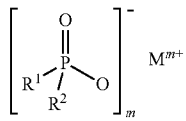

I

-continued

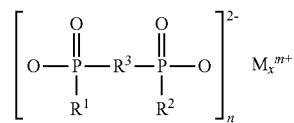

II wherein $R^1$ and $R^2$ are independently selected from the group consisting of hydrogen, linear or branched $C_1$-$C_6$ alkyl groups, and aryl groups; $R^3$ is a linear or branched $C_1$-$C_{10}$-alkylene group, or a $C_6$-$C_{10}$-arylene group, a $C_6$-$C_{10}$-alkylarylene or a $C_6$-$C_{10}$-arylalkylene group; M is a metal ion selected from the group consisting of calcium ions, magnesium ions, aluminum ions, zinc ions, and mixtures thereof, m is 2 to 3; n is 1 or 3; and x is 1 or 2 with the proviso that when m is 2 in formula II, then x and n are each 1, and when m is 3, x is 2 and n is 3; and C. from at or about 0.25 to at or about 15 weight percent, based on the total weight of the flame retardant composition, of one or more polyhydroxy polymers having a number average molecular weight of at least 2000, selected from the group consisting of ethylene vinyl alcohol copolymers and poly(vinyl alcohol)s, wherein type 5A test bars having a thickness of 2 mm and an overall length of 75 mm as described in ISO 527-2, made of the flame retardant composition, when exposed in an atmosphere of air and at a temperature of 136° C. for a test period of about 80 hours, and tested according to the method of ISO 527 at a testing speed of 50 mm/min, have, on average, a retention of elongation at break of at least 70 percent as compared with that of an unexposed control having identical composition and shape.

15. A method for making an article having long-term high temperature aging resistance, the method comprising the steps of:

A. melt blending a composition of claim 1 wherein the melt temperature is at least 260° C.; and B. shaping the composition to form an article.

* * * * *